Nov. 29, 1960     S. FINKELSTEIN     2,962,138
COLLAPSIBLE FLAT-LYING LUGGAGE HANDLE
Filed June 26, 1959     3 Sheets-Sheet 1
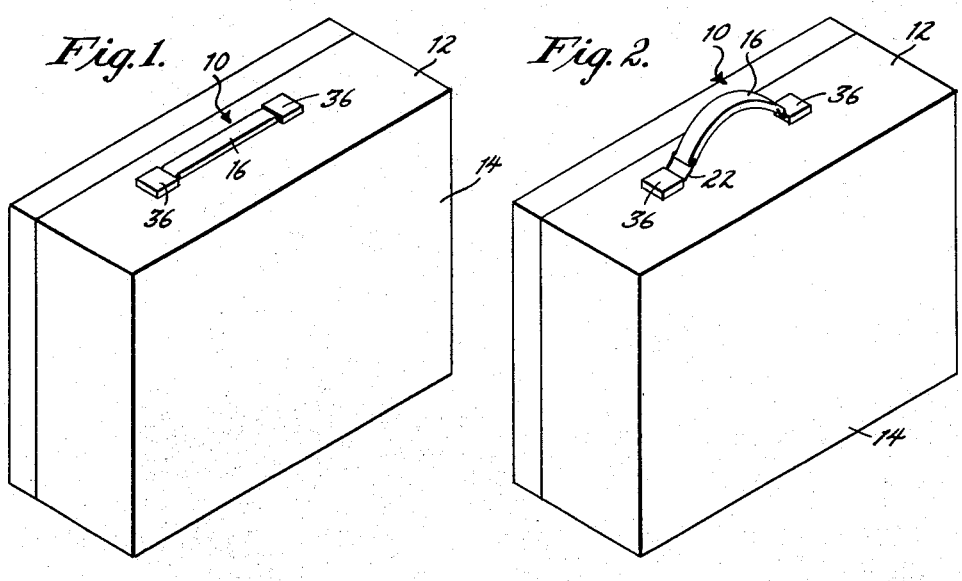
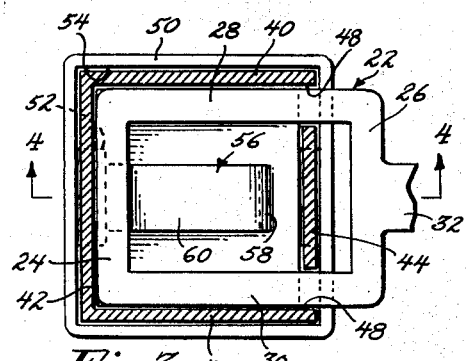
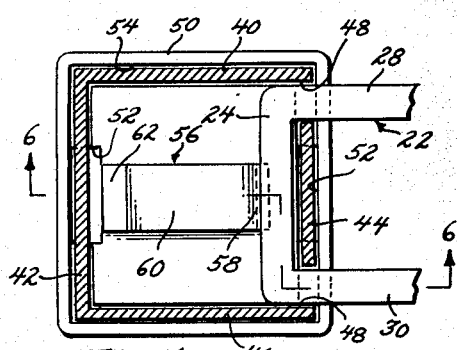
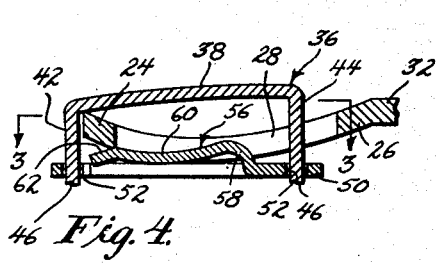
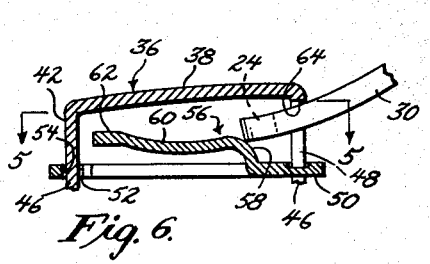
INVENTOR.
SAB FINKELSTEIN
BY Max R. Millman
ATTORNEY

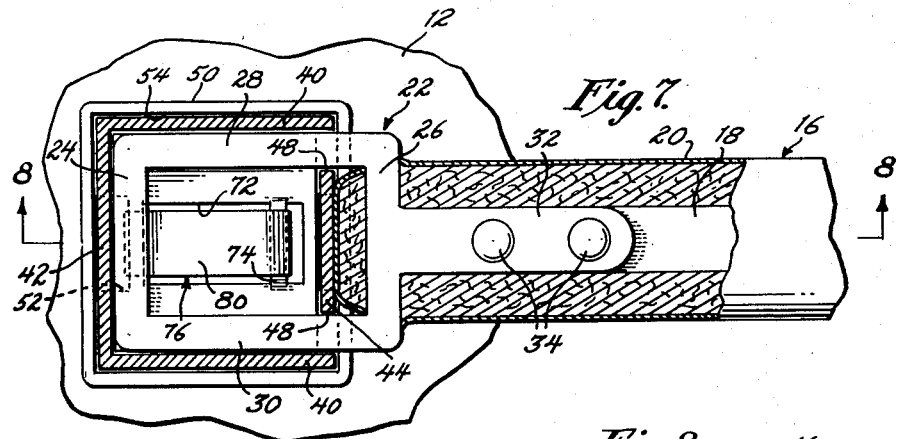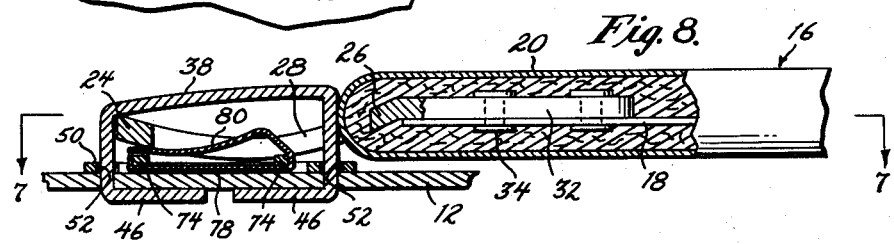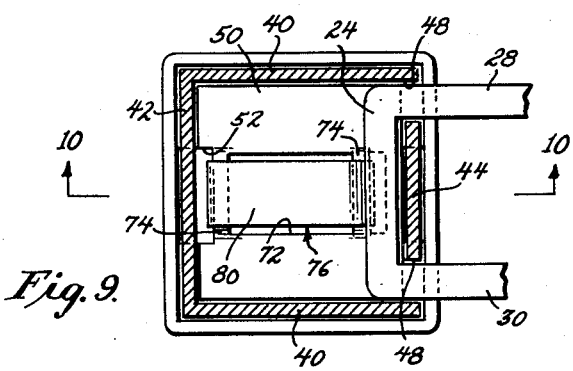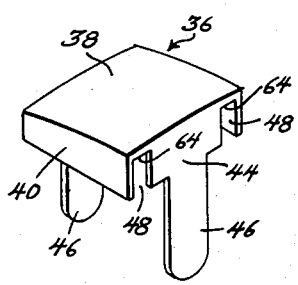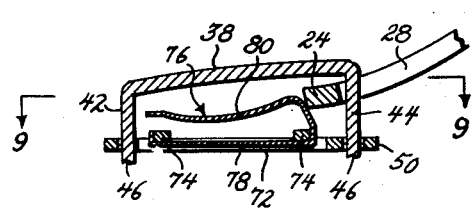

Nov. 29, 1960 S. FINKELSTEIN 2,962,138
COLLAPSIBLE FLAT-LYING LUGGAGE HANDLE
Filed June 26, 1959 3 Sheets-Sheet 3
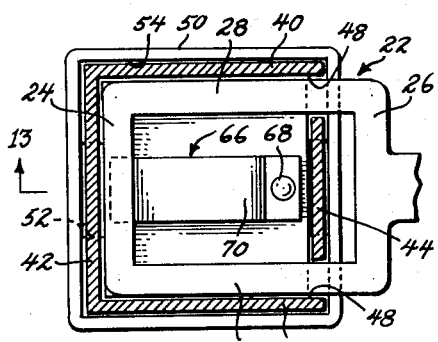
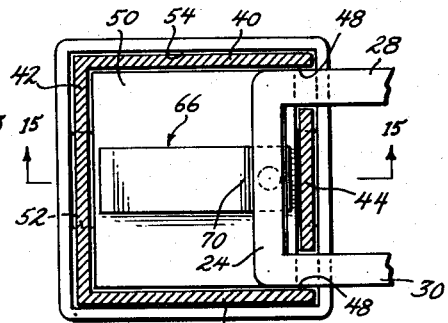
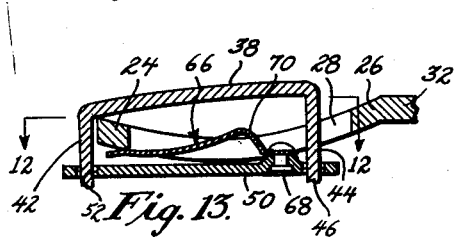
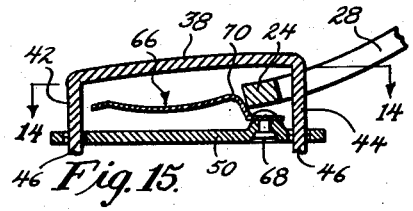
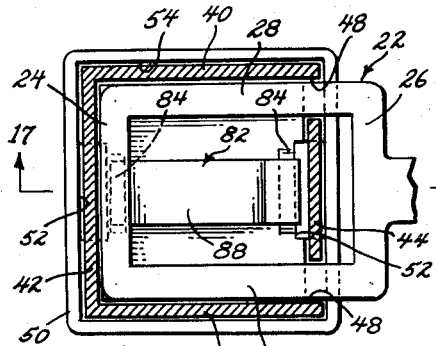
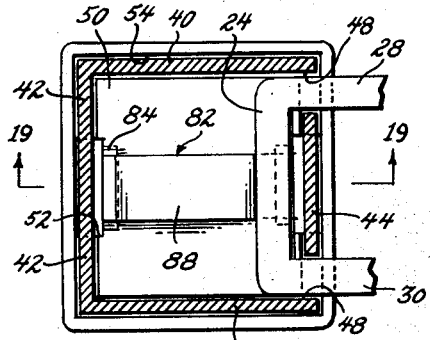
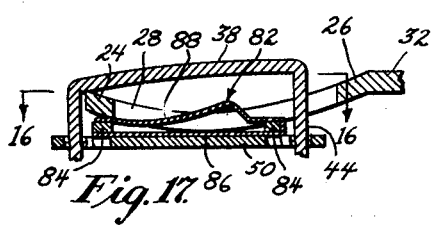
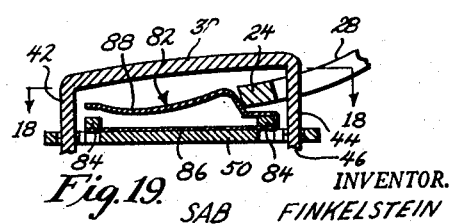
INVENTOR.
SAB FINKELSTEIN
BY
May R. Millman
ATTORNEY United States Patent Office 2,962,138
Patented Nov. 29, 1960

2,962,138

COLLAPSIBLE FLAT-LYING LUGGAGE HANDLE

Sab Finkelstein, Glenside, Pa., assignor to Philadelphia Handle Company, Camden, N.J., a corporation of New Jersey Filed June 26, 1959, Ser. No. 823,109

7 Claims. (Cl. 190—57)

This invention relates to a handle for luggage, carrying cases and similar containers adapted to be pulled into an arched carrying position and to be readily collapsed into a flat non-carrying position against a wall of the container and constitutes an improvement over the handle disclosed in the Waterer Patent No. 1,736,640.

The primary object of the invention is to provide a flat-lying handle of the character described wherein the same can be releasably locked in the arched carrying position merely by pulling up on the handle to a predetermined position.

Another object of the invention is to provide a flat-lying handle of the character described wherein the means to releasably lock the handle in the arched carrying position also serves the function of restraining the handle from rattling in its collapsed position flat against a wall of the container to which the handle is attached, a feature of importance especially in sound-producing equipment such as portable radios, phonographs, etc.

Another object of the invention is to provide a flat-lying handle in which the means to releasably retain it in the arched carrying position and to restrain the rattling thereof in the flat non-carrying position is relatively simple, inexpensive to manufacture, assemble and replace if necessary, and positive in its action.

These and other objects of the invention will become more apparent as the following description proceeds in conjunction with the accompanying drawing, wherein:

Figure 1 is a perspective view of a container with the present handle thereon in the collapsed non-carrying position flat against a wall thereof;

Figure 2 is a view similar to Figure 1 showing the handle in the arched carrying position;

Figure 3 is a sectional view taken on the line 3—3 of Figure 4;

Figure 4 is a sectional view taken on the line 4—4 of Figure 3;

Figure 5 is a sectional view taken on the line 5—5 of Figure 6;

Figure 6 is a sectional view taken on the line 6—6 of Figure 5;

Figure 7 is a sectional view of a modified form of the invention and taken on line 7—7 of Figure 8;

Figure 8 is a sectional view taken on the line 8—8 of Figure 7;

Figure 9 is a sectional view taken on the line 9—9 of Figure 10;

Figure 10 is a sectional view taken on the line 10—10 of Figure 9;

Figure 11 is a perspective view of the anchor guide housing;

Figure 12 is a sectional view of another form of the invention and taken on line 12—12 of Figure 13;

Figure 13 is a sectional view taken on line 13—13 of Figure 12;

Figure 14 is a sectional view taken on the line 14—14 of Figure 15;

Figure 15 is a sectional view taken on the line 15—15 of Figure 14;

Figure 16 is a sectional view of yet another form of the invention and taken on line 16—16 of Figure 17;

Figure 17 is a sectional view taken on line 17—17 of Figure 16;

Figure 18 is a sectional view taken on line 18—18 of Figure 19; and

Figure 19 is a sectional view taken on line 19—19 of Figure 18.

Specific reference is now made to the drawings wherein similar reference characters are used for corresponding elements throughout.

The present invention relates to a handle construction 10 of the type which is adapted to lie flat against a wall 12 of a piece of luggage 14 to which it is attached, as shown in Figure 1, and to be pulled into an arched carrying position as shown in Figure 2. It is to be understood that the term "luggage" as used herein means briefcases, trunks, handbags, suitcases and any and all carrying cases, such for example as portable radios, phonographs, etc. The handle includes an elongated grip portion 16 having an elongated strip or blade of steel spring 18 suitably covered by leather, plastic or other material 20. At each end of the grip, a link 22 is provided consisting of a concavo-convex rectangular member having transverse members 24 and 26 joined by longitudinal members 28 and 30. The transverse member 26 of each link 22 passes through a conventional hinge loop, see Figures 2 and 8, and includes a bar 32 which is riveted or otherwise secured as at 34 to each end of the spring 18.

To slidably anchor the links 22 on the wall 12 of the luggage 14, a guide housing 36, see Figure 11, is provided for each link, the housing being a hollow member having an upper wall 38, side walls 40, an outer end wall 42, an inner end wall 44 and ears 46 depending from the end walls adapted to extend through suitable openings in and to be clinched about the wall 12 of the luggage as shown in Figure 8. The inner wall 44 faces the opposite ends of the hand grip portion 16 and is provided with spaced vertically extending slots 48 which slidably receive the longitudinal members 28 and 30 of each link, the transverse member 24 thereof being disposed inside the housing 36.

A means is provided which is readily and easily assembled with the handle to serve the dual function of releasably locking the handle in the arched carrying position of Figure 2 and of restraining rattling of the links 22 in the anchor or guide housings 36 when the handle is collapsed and lies flat against the wall 12 as in Figure 1.

This means comprises a plate 50 of dimensions exceeding that of the guide or anchor housing 36, the plate being positioned on the wall 12 of the luggage, as shown in Figures 7 and 8, before the guide housing is attached thereto. The plate includes spaced transversely extending slots 52 through which the ears 46 of the housing 36 extend until the free edges of the housing seat in a peripheral groove 54 in the plate spaced inwardly of the edges thereof. When so seated, the ears are clinched around the wall 12 of the luggage whereby both the housing 36 and plate 50 are firmly anchored on the wall 12, as seen particularly in Figure 8. The plate mounts a longitudinal resilient member disposed in the housing which performs the releasable lock and anti-rattling functions and the modifications herein shown differ primarily with respect to the manner in which the resilient member is secured to the plate.

In the modification shown in Figures 3–6, the resilient member is a longitudinal tongue 56 upstruck and offset centrally from plate 50 and having a corner portion 58 facing and adjacent the slotted end wall 44 of the guide housing. The tongue includes an upper concave portion 60 facing the upper wall 38 of the housing and a relatively flat ledge portion 62 at the free end of the tongue which joins with the concave portion.

In use, when the handle is moved from the raised position of Figure 2 to the flat position of Figure 1 the transverse member 24 of the link 22 rides over the concave portion 60 of the tongue 56 until it reaches the flat ledge portion 62, the resiliency of the tongue being such as to urge the transverse member 24 of the link firmly against the upper wall 38 of the guide housing, as seen in Figure 4, thereby eliminating rattling of the links in the guide housings in said flattened non-carrying position of the handle. When an upward pull is exerted on the grip 16, the links 22 ride over the tongues depressing them slightly until the transverse member 24 clears the corner portion 58 of the tongue. The bowed spring 18, shown in Figures 7 and 8, in the grip exerts a force on the links 22 urging the transverse member 24 against the corner portion 58 and the longitudinal members 28 and 30 against the upper edges 64 of the slots 48, where the handle is lockingly retained by a snap action in an arched carrying position as seen in Figure 6. Sufficient downward pressure on the grip 16 will cause the transverse member 24 to slide over the corner portion 58 and onto the concave portion of the tongue where it rides until the position of Figure 4 is attained.

The modification shown in Figures 12–15 differs from that previously described with reference to Figures 3–6 in that the tongue 66 thereof, which is equivalent in function to tongue 56, is not integral with but rather attached to the plate 50 by means of a rivet 68 adjacent the corner portion 70 thereof. Otherwise tongue 66 functions like tongue 56.

In the modification shown in Figures 7–10, the plate 50 is cut out centrally as at 72 and includes two transverse upstruck portions 74 bridging the cut-out portion. The tongue is in the form of a removable longitudinal spring 76 having vertically spaced leaves, the lower one 78 of which wraps around and engages the upstruck portions 74, the upper one 80 of which has a concave surface, flat ledge at its free end and corner adjacent the slotted end wall 44 of the housing as in the case of the tongue 56 previously described. The tongue 76 functions like tongue 56 except that it is removably connected to the plate 50.

In the modification shown in Figures 16–19 the spring tongue 82 is the same as that of Figures 7–10 but the plate 50 thereof does not have a central cut-out portion. Rather it has two upstruck transverse bars 84 so that the lower leaf 86 of the tongue can be press fit between the bars and rest on the plate 50 while the upper leaf 88 is free for engagement by transverse member 24 of the link urging the latter towards the upper wall 38 of the housing. As in the form of invention shown in Figures 7–10, the tongue 82 is also removable.

Minor variations may be made by skilled artisans without departing from the spirit of the invention and the scope of the appended claims.

I claim:

1. A collapsible luggage handle comprised of a longitudinally flexible hand grip portion capable of being arched to a carrying position and flattened to a non-carrying position, a spring in said hand grip portion normally urging the same into said flattened position, links connected to the opposite ends of said grip portion, guides having upper walls and adapted for attachment to luggage with said upper walls spaced thereabove, said guides slidably receiving said links, and means to releasably lock said handle in the arched carrying position and to restrain rattling of said links in said guides in the flattened position, said means including a longitudinally extending resilient member in each guide having a portion bearing against each link and urging the same against said upper wall of said guide when said grip portion is in the flattened position, said member including a corner portion facing each end of said grip portion bearing against a portion of each link and co-acting with said spring when bowed to releasably hold said handle in its arched carrying position.

2. A collapsible luggage handle comprised of a longitudinally flexible hand grip portion capable of being arched to a carrying position and flattened to a non-carrying position, a spring in said hand grip portion normally urging the same into said flattened position, substantially rectangular links curved lengthwise and connected to the opposite ends of said grip portion, guides in the form of housings adapted for attachment to the luggage each including an upper wall and a slotted end wall slidably receiving said link, and means to releasably lock said handle in the arched carrying position and to restrain rattling of said links in said guides in the flattened position, said means including a longitudinally extending resilient member in said guide housing having a longitudinal arcuate portion bearing against a transverse portion of said link and urging it against said upper wall of said guide housing when said handle is in the flattened position, said resilient member including a corner portion facing said slotted end wall of said guide housing bearing against said transverse portion of said link and co-acting with said spring when bowed to releasably hold said handle in its arched carrying position.

3. The combination of claim 2 wherein said longitudinal arcuate portion of said resilient member is concave and faces said upper wall of said guide housing and said link is similarly curved.

4. A collapsible luggage handle comprised of a longitudinally flexible hand grip portion capable of being arched to a carrying position and flattened to a non-carrying position, a spring in said hand grip portion normally urging the same into said flattened position, links connected to opposite ends of said grip portion, plates adapted to be positioned on luggage, guides in the form of housings each having an upper wall and an open lower end and adapted to be secured to luggage with said lower end bearing on said plate, said guides slidably receiving said links, and means on said plate to releasably lock said handle in the arched carrying position and to restrain rattling of said links in said guides in the flattened position, said means including a resilient longitudinal tongue secured to each of said plates and offset therefrom towards said upper wall of said guide, said tongue including a corner bearing against said link and coacting with said spring when bowed to releasably hold said handle in its arched carrying position, said tongue also including a portion spaced from said corner bearing on said link and urging it against said upper wall of said guide when said grip portion is in the flattened position to restrain rattling of said links in said guides.

5. The combination of claim 4 wherein each guide also includes an end wall having spaced vertical slots and each link includes a pair of longitudinal members extending slidably through said slots and a transverse member joining said longitudinal members and disposed in said guide, said transverse member coacting with said corner and said portion of said tongue spaced therefrom in said selective carrying and flattened positions of the handle.

6. The combination of claim 5 wherein said tongue includes a concave surface between said corner and said portion spaced therefrom, said concave surface facing said upper wall of said guide and said transverse member of said link riding on said concave surface during movement of said handle from the arched carrying position to the flattened position.

7. The combination of claim 6 wherein said longitudinal members of said link are concavo-convex with the concave surfaces thereof facing said upper wall of said guide.

References Cited in the file of this patent

UNITED STATES PATENTS

| | | |
|---|---|---|
| 1,736,640 | Waterer | Nov. 19, 1929 |
| 2,106,911 | Garfinkel | Feb. 1, 1938 |
| 2,195,028 | Finkelstein | Mar. 26, 1940 |
| 2,242,283 | Avery | May 20, 1941 |

FOREIGN PATENTS

| | | |
|---|---|---|
| 13,422 | Australia | May 22, 1928 |
| 333,176 | Great Britain | Aug. 5, 1930 |
| 554,243 | Great Britain | June 25, 1943 |